(12) United States Patent
Kim (10) Patent No.: US 11,661,039 B1
(45) Date of Patent: May 30, 2023

(54) PARKING BRAKE APPARATUS FOR A VEHICLE

(71) Applicants: Hyundai Motor Company, Seoul (KR); Kia Corporation, Seoul (KR)

(72) Inventor: Hwan Chul Kim, Gimpo-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/841,947

(22) Filed: Jun. 16, 2022

(30) Foreign Application Priority Data

Jan. 14, 2022  (KR) .................. 10-2022-0005612

(51) Int. Cl.
*B60T 7/10* (2006.01)

(52) U.S. Cl.
CPC .................... *B60T 7/105* (2013.01)

(58) Field of Classification Search
CPC .......... B60T 7/105; B60T 7/104; B60T 7/102; B60T 7/10
See application file for complete search history.

(56) References Cited

U.S. PATENT DOCUMENTS

| | | | |
|---|---|---|---|
| 7,637,179 B2 | 12/2009 | Nitsche | |
| 9,616,863 B2 | 4/2017 | Pereira | |
| 2007/0227290 A1* | 10/2007 | Ferenc | B60T 7/105 74/523 |
| 2008/0041673 A1* | 2/2008 | Tsuzuki | B60T 7/105 188/2 R |
| 2010/0242666 A1* | 9/2010 | Kim | G05G 5/18 74/535 |
| 2010/0294075 A1* | 11/2010 | Barcin | B60T 7/105 74/523 |

FOREIGN PATENT DOCUMENTS

| | | | | |
|---|---|---|---|---|
| EP | 1378410 A2 * | 1/2004 | ............. | B60T 7/105 |
| JP | H 7 205777 A | 8/1995 | | |
| JP | 2008 044535 A | 2/2008 | | |
| KR | 10 2001 0065872 A | 7/2001 | | |
| KR | 10 1776569 B1 | 9/2017 | | |
| WO | WO-2016080015 A1 * | 5/2016 | ................ | B60T 7/10 |

OTHER PUBLICATIONS

USPTO Machine Translation (retrieved from FIT database) of the Description of EP 1378410 A2, Bauer, Jan. 7, 2004. (Year: 2022).*

* cited by examiner

*Primary Examiner* — Daniel D Yabut
(74) *Attorney, Agent, or Firm* — Morgan, Lewis & Bockius LLP (57) ABSTRACT

A parking brake apparatus of a vehicle, includes: a support plate fixed on a vehicle; a ratchet including a gear unit including a plurality of teeth and provided adjacent to the support plate; an operation lever connected to a rotation shaft passing through the ratchet, wherein the rotation shaft is rotatable in operation of the operation lever; and a pawl coupled to the operation lever, and including an edge portion elastically in contact with the teeth, wherein the operation lever is provided with a locking jaw for preventing contact between the pawl and the gear unit, wherein the locking jaw is provided between the gear unit and the pawl.

11 Claims, 7 Drawing Sheets

PARKING BRAKE APPARATUS FOR A VEHICLE

CROSS-REFERENCE TO RELATED APPLICATION(S)

The present application claims priority to Korean Patent Application No. 10-2022-0005612 filed on Jan. 14, 2022 the entire contents of which is incorporated herein for all purposes by this reference.

BACKGROUND OF THE PRESENT DISCLOSURE

Field of the Present Disclosure

The present disclosure relates to a parking brake apparatus for a vehicle.

Description of Related Art

In general, a parking brake apparatus for a vehicle, or the like, is used to stop or park a vehicle, and is also called a hand brake or a side brake.

The parking brake apparatus functions to keep the vehicle in a stopped state, and serves to brake a rear wheel, a front wheel, or the like, of the vehicle to maintain a parking state of the vehicle.

For example, the above-described parking brake may include a parking brake drum, a shoe, and a spring to bring the parking brake shoe into close contact with the parking brake drum to brake wheels of the vehicle.

On the other hand, in the parking brake apparatus for a vehicle, when an operation lever is raised, a brake cable, having one end thereof connected to the operation lever, is pulled, to operate the parking brake, and a pawl thereof is held by the teeth of a ratchet to maintain a parking state.

On the other hand, when the parking state is released, when a push button is pressed while holding the operation lever, a push rod connected thereto pushes one side of the pawl to release the pawl from the teeth of the ratchet to release the parking state.

However, there is a problem in that quality problems may occur due to friction noise between the pawl and the ratchet in an initial stage of raising the operation lever. In other words, when the parking brake apparatus for a vehicle is not used, the pawl is provided adjacent to the teeth of the ratchet while the pawl is spaced from the teeth of the ratchet. Accordingly, when a user raises the operation lever, the pawl is moved and coupled to the teeth of the ratchet. However, to minimize a movement distance of the pawl, when the parking brake apparatus for a vehicle is not used, the parking brake apparatus for a vehicle is designed so that the pawl is provided as close as possible to the teeth of the ratchet. Accordingly, when a user raises the operating lever, there is a problem in that the pawl moves and comes into contact with the ratchet, causing friction noise.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a parking brake apparatus of a vehicle configured for reducing or preventing the occurrence of friction noise between a pawl and a ratchet during initial rotation of an operation lever.

According to an aspect of the present disclosure, a parking brake apparatus of a vehicle is disclosed. The parking brake apparatus of a vehicle includes: a support plate fixed on a vehicle; a ratchet including a gear unit including a plurality of teeth and provided adjacent to the support plate; an operation lever connected to a rotation shaft passing through the ratchet, wherein the rotation shaft is rotatable in operation of the operation lever; and a pawl coupled to the operation lever, and including an edge portion elastically in contact with the teeth, wherein the operation lever may be provided with a locking jaw for preventing contact between the pawl and the gear unit, wherein the locking jaw may be provided between the gear unit and the pawl.

The locking jaw may be formed by cutting a portion of one side surface of the operation lever and then bending the same.

The locking jaw may be provided so that one side surface thereof is in contact with a side surface of the pawl.

The locking jaw may be formed of a protrusion provided to extend from an internal surface of the operation lever to protrude therefrom.

The locking jaw may be formed of a plurality of pins protruding from an internal surface of the operation lever.

The rotation shaft may be provided to pass through the support plate and the ratchet and to be connected to the operation lever.

The pawl may be connected to a first hinge pin hingedly coupled to the operation lever, and a first torsion spring provided on the first hinge pin so that the teeth are elastically in contact with the pawl.

The parking brake apparatus of a vehicle may further include a fixing release unit provided in an internal space of the operation lever and releasing fixing of the pawl and the ratchet by moving the pawl.

The fixing release unit includes a push rod provided in an internal space of the operation lever and in which an upper end portion of the pawl is connected to a lower end portion thereof, a second hinge pin provided on the operation lever passing through a lower portion of the push rod so that the push rod may be rotated, and a second torsion spring connected to the second hinge pin and elastically supporting the push rod in one direction thereof.

The push rod may have an elongated slot formed through a center portion, and a stop pin for limiting horizontal movement of the push rod may be provided in the elongated slot.

The ratchet may include a plate unit including a through hole so that the rotation shaft passes therethrough, the gear unit including the plurality of teeth provided on one side surface of the plate unit, and a fixing unit formed to extend from a bottom surface of the plate unit to be connected to the vehicle.

The gear unit may be detachably provided on the plate unit.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The predetermined design features of the present disclosure as disclosed herein, including, for example, predetermined dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments in the present disclosure will be described hereinafter with reference to the accompanying drawings. The present disclosure may, however, be exemplified in many different forms and should not be construed as being limited to the specific embodiments set forth herein. Rather, these embodiments are provided so that the present disclosure will be thorough and complete, and will fully convey the scope of the present disclosure to those skilled in the art. In the drawings, the same reference numerals will be used throughout to designate the same or like elements, and the shapes and dimensions of elements may be exaggerated for clarity.

Figure 1:
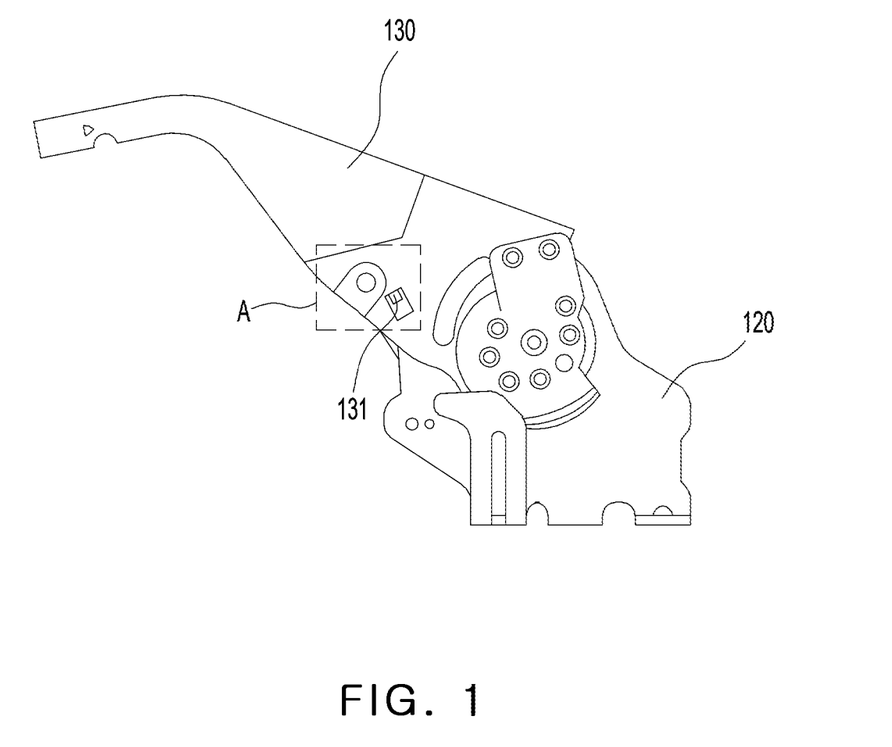
FIG. 1 is a side view exemplarily illustrating a parking brake apparatus of a vehicle according to an exemplary embodiment of the present disclosure.
Figure 2:
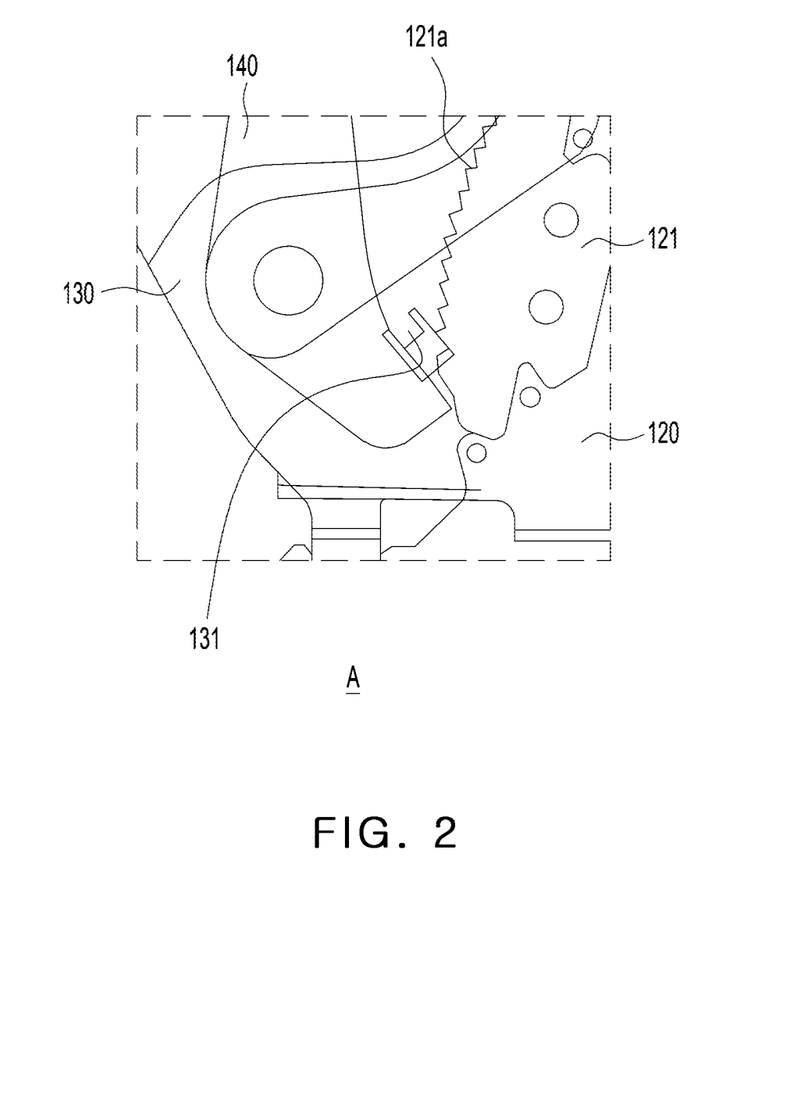
FIG. 2 is a projection view exemplarily illustrating portion A of FIG. 1.

FIG. 1 is a side view exemplarily illustrating an operation lever and a ratchet provided in a parking brake apparatus of a vehicle according to an exemplary embodiment of the present disclosure, and FIG. 2 is a projection view exemplarily illustrating portion A of FIG. 1.

Referring to FIG. 1 and FIG. 2, an operation lever 130 is rotatably provided on a ratchet 120, and the ratchet 120 is fixed on a vehicle. On the other hand, the operation lever 130 may include a locking jaw 131. The locking jaw 131 may be formed by cutting a portion of one side surface of the operation lever 130 and then bending the same toward an internal space side of the operation lever 130 (a direction in which a pawl is provided will be described later). Meanwhile, as illustrated in FIG. 2, a pawl 140 may be provided in an internal space of the operation lever 130, and a gear unit 121 provided opposite to the pawl 140 may be provided in the ratchet 120. On the other hand, the gear unit 121 is provided with a plurality of teeth 121a, and when the operation lever 130 rotates in one direction, an edge portion of the pawl 140 is coupled to the teeth 121a so that the pawl 140 is fixed to the ratchet 120, and when the operation lever 130 is rotated in an opposite direction, the edge portion of the pawl 140 is spaced from the gear unit 121 with a predetermined distance.

On the other hand, when the operation lever 130 is rotated in the opposite direction and the operation lever 130 is provided at a base position, the locking jaw 131 is in contact with a side surface of the pawl 140 to dispose the edge portion of the pawl 140 to be spaced from the gear unit 121 with a predetermined distance.

Accordingly, when the operation lever 130 is rotated in one direction and is driven so that the edge portion of the pawl 140 is coupled to the teeth 121a, contact between the pawl 140 and the gear unit 121 may be prevented to reduce noise occurrence in an initial stage. In other words, when the operation lever 130 is driven, when the pawl 140 is initially moved, to prevent the edge portion of the pawl 140 from being in contact with a portion provided below the teeth 121a of the gear unit 121, a locking jaw 131 is provided on the operation lever 130.

On the other hand, when the operation lever 130 is rotated in one direction by the locking jaw 131 and is driven so that the edge portion of the pawl 140 is coupled to the teeth 121a, contact between the edge portion of the pawl 140 and the gear unit 121 may be prevented in an initial stage, so when the pawl 140 is manufactured, a burr removal process of removing the burr formed in the pawl 140 may be omitted. Accordingly, manufacturing costs may be reduced.

Hereinafter, a detailed configuration of the parking brake apparatus of a vehicle will be described in more detail.

Figure 3:
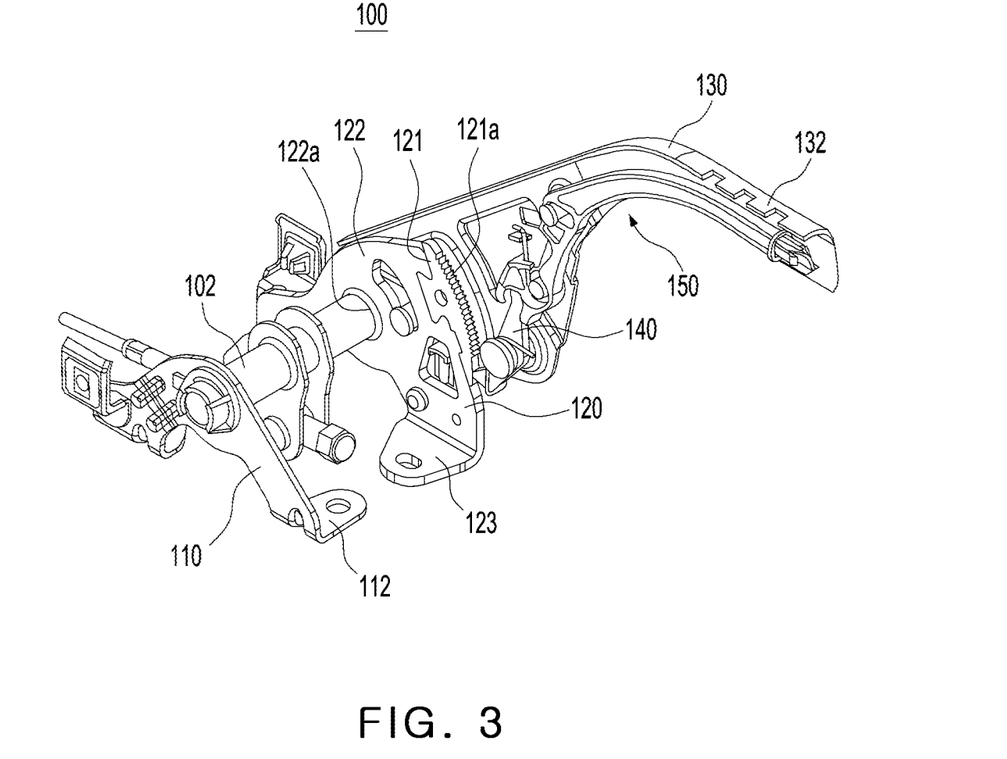
FIG. 3 is a schematic perspective view exemplarily illustrating a parking brake apparatus of a vehicle according to an exemplary embodiment of the present disclosure.

FIG. 3 is a schematic perspective view exemplarily illustrating a parking brake apparatus of a vehicle according to an exemplary embodiment of the present disclosure.

FIG. 3 is a schematic perspective view viewed from a side opposite to the side illustrated in FIG. 1, and in FIG. 3, a case in which one side of an operation lever is removed to illustrate a configuration provided in an internal space of the operation lever is illustrated.

Referring to FIG. 3, the parking brake apparatus 100 for a vehicle according to an exemplary embodiment of the present disclosure may include, for example, a support plate 110, a ratchet 120, an operation lever 130, a pawl 140, and a fixing release unit 150.

A lower end portion of the support plate 110 may be fixed on a vehicle. To the present end, the support plate 110 may include a vehicle fixing unit 112 formed to extend from the lower end portion. The vehicle fixing unit 112 may be fixed to the vehicle by a fastening member, for example, a bolt, a nut, and the like. On the other hand, the support plate 110 may be provided so that the rotation shaft 102 passes therethrough.

The ratchet 120 may be provided adjacent to the support plate 110, and may be provided so that the rotation shaft 102 passes therethrough. As an exemplary embodiment of the present disclosure, the ratchet 120 may include a plate unit 122 provided with a through-hole 122a so that the rotation shaft 102 is provided therethrough, a gear unit 121 provided with a plurality of teeth 121a provided on one side surface of the plate unit 122, and a fixing unit 123 formed extending from a bottom surface of the plate unit 122 and connected to a vehicle. In other words, the ratchet 120 is configured to rotatably support the rotation shaft 102 together with the support plate 110, and fix the parking brake apparatus of a vehicle 100 to the vehicle.

As an exemplary embodiment of the present disclosure, the gear unit 121 may be detachably provided on the plate unit 122. As described above, because the gear unit 121 is detachably provided on the plate unit 122, the gear unit 121 may be provided on the plate unit 122 of the ratchet 120 after the teeth 121a are separately manufactured. Accordingly, the teeth 121a may be easily replaced while simplifying manufacturing and assembly of the teeth 121a. Meanwhile, the gear unit 121 may be provided on one side surface of the plate unit 122 so that a plurality of teeth 121a are inclined with respect to a ground. As described above, the teeth 121a may be provided to be inclined, a case in which a sharp portion of the pawl 140 and a sharp portion of the teeth 121a abut may be reduced.

On the other hand, the rotation shaft 102 is provided rotatably through the support plate 110 and the ratchet 120 horizontally and is connected to a brake cable, while providing a portion where the operation lever 130 is mounted and allowing the brake cable to be pulled by angular rotation of the operation lever 130.

The operation lever 130 has an internal space, and is connected to the rotation shaft 102 to rotate. As an exemplary embodiment of the present disclosure, the operation lever 130 may have a handle unit 132 provided in an upper end portion thereof, and enable a driver to operate or release a parking brake while holding the handle unit 132 and raising the same upwardly or lowering the same downwardly. Meanwhile, in FIG. 3, one side of the operation lever 130 is removed to expose components such as the pawl 140 and the fixing release unit 150 provided therein and illustrated. That is, the operation lever 130 may have an internal space in which components such as the pawl 140, the fastening release unit 150, and the like, are not exposed externally.

The pawl 140 may be connected to the operation lever 130, and any one edge portion may be elastically in contact with the teeth 121a. On the other hand, the pawl 140 may be moved by the fastening release unit 150 to be spaced from the teeth 121a or to be in contact with each other elastically. A detailed description thereof will be provided later.

The fixing release unit 150 is provided in the internal space of the operation lever 130, and is configured to release the fixing of the pawl 140 and the ratchet 120 by moving the pawl 140.

Figure 4:
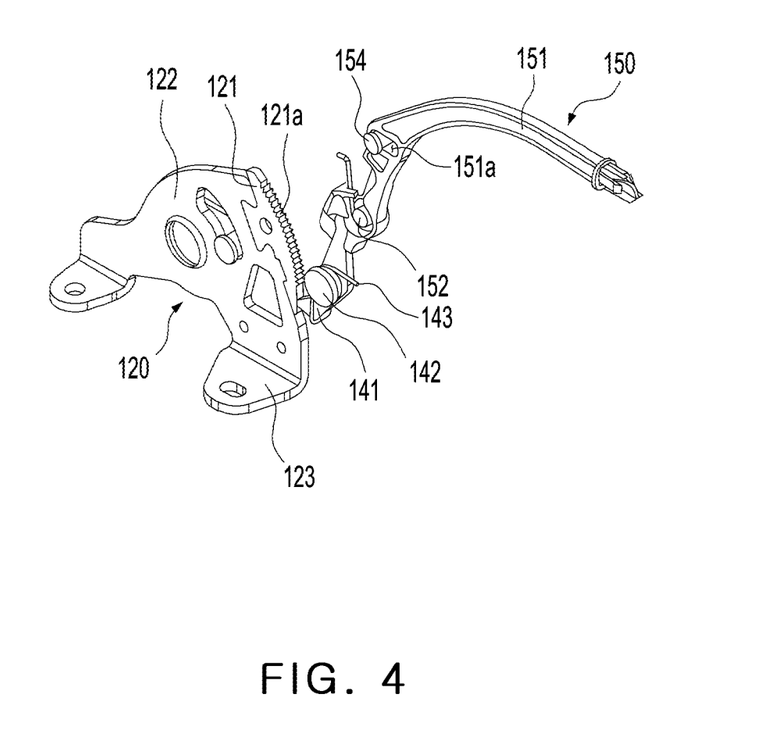
FIG. 4 is a perspective view exemplarily illustrating a pawl and a fixing release unit of the parking brake apparatus of a vehicle according to an exemplary embodiment of the present disclosure.
Figure 5:
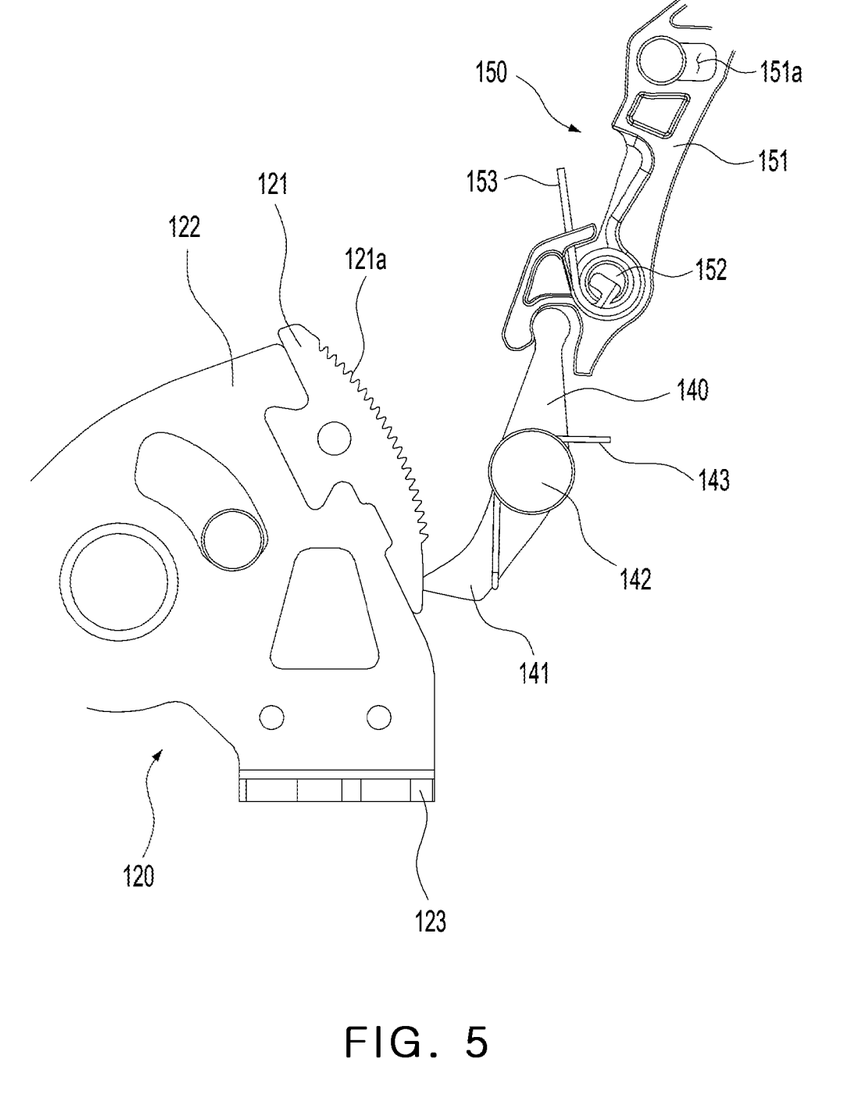
FIG. 5 is a partially enlarged side view for illustrating a pawl and a fixing release unit of the parking brake apparatus of a vehicle according to an exemplary embodiment of the present disclosure.

FIG. 4 is a perspective view for illustrating a pawl and a fixing release unit of a parking brake apparatus of a vehicle according to an exemplary embodiment of the present disclosure, and FIG. 5 is an enlarged side view for illustrating a pawl and a fixing release unit of a parking brake apparatus of a vehicle according to an exemplary embodiment of the present disclosure.

Referring to FIG. 4 and FIG. 5, the pawl 140 may have a plate shape in which a lower end portion thereof is inclined at a predetermined angle. That is, the pawl 140 may be provided with an inclined portion 141 in a lower end portion, and any one edge portion of the inclined portion 141 may be elastically in contact with the above-described teeth 121a.

Furthermore, the pawl 140 may include a first hinge pin 142 to be hingedly coupled to the operation lever 130, and a first torsion spring 143 provided on the first hinge pin 142.

The first torsion spring 143 allows any one edge portion of the inclined portion 141 to be elastically in close contact with the teeth 121a. As an exemplary embodiment of the present disclosure, the first torsion spring 143 may have one end portion connected to the pawl 140 and the other end portion connected to the operation lever 130.

An upper end portion of the pawl 140 may be connected to a push rod 151 to be described later.

The fixing release unit 150 may include a push rod 151 provided in an internal space of the operation lever 130 and including an upper end portion of the pawl 140 connected to a lower end portion thereof, a second hinge pin 152 provided on the operation lever 130 to pass through a lower portion of the push rod 151 so that the push rod 151 may be rotated, and a second torsion spring 153 connected to the second hinge pin 152 and elastically supporting the push rod 151 in one direction thereof.

On the other hand, the push rod 151 may be provided with an elongated slot 151a formed to pass through a center portion, and a stop pin 154 for limiting horizontal movement of the push rod 151 may be provided in the elongated slot 151a.

Here, looking briefly at an operation of the fixing release unit 150, when a driver presses an upper end portion of the push rod 151, the push rod 151 moves horizontally in a rear direction along the elongated slot 151a, in a state supported by the stop pin 154. Accordingly, while a lower end portion of the push rod 151 is rotated in one direction around the second hinge pin 152, the pawl 140 may be rotated in the other direction around the first hinge pin 142 so that the pawl 140 may be spaced from the teeth 121a.

In other words, when a driver presses an upper end portion of the push rod 151, the push rod 151 rotates the pawl 140 while being moved backward so that engagement of the pawl 140 with the ratchet 120 may be released. That is, the second hinge pin 152 is configured to rotatably mount the lower end portion of the push rod 151 to the operation lever 130, so that the push rod 151 may be rotated around the lower end portion while being moved backward thereof. Thus, the pawl 140 connected to the lower end portion of the push rod 151 may be rotated.

The second torsion spring 153 has one end portion caught on the push rod 151 and the other end portion caught on the operation lever 130 to elastically pressurize the push rod 151 for the operation lever 130, allowing the push rod 151 to elastically return to the original state thereof after being moved by a driver.

Meanwhile, as illustrated in FIG. 2, when the parking brake apparatus of a vehicle 100 is not used, an edge portion of the pawl 140 is spaced from the ratchet 120 with a predetermined distance. In the instant state, when the driver rotates the operation lever 130, the pawl 140 is engaged with the ratchet 120 while the edge portion of the pawl 140 moves along the teeth 121a of the gear unit 121. However, in an exemplary embodiment of the present disclosure, when the parking brake device 100 for a vehicle is not used, because the locking jaw 131 is provided to support one side surface of the pawl 140, an edge portion of the pawl 140 and a region provided in a lower portion of the teeth 121a of the gear unit 121 are spaced from each other with a predetermined distance or more. Accordingly, when the driver initially drives the operation lever 130 to rotate, friction noise generated while the edge portion of the pawl 140 and the region provided in a lower portion of the teeth 121a of the gear unit 121 come into contact with each other may be reduced or occurrence of the friction noise may be prevented.

Figure 6:
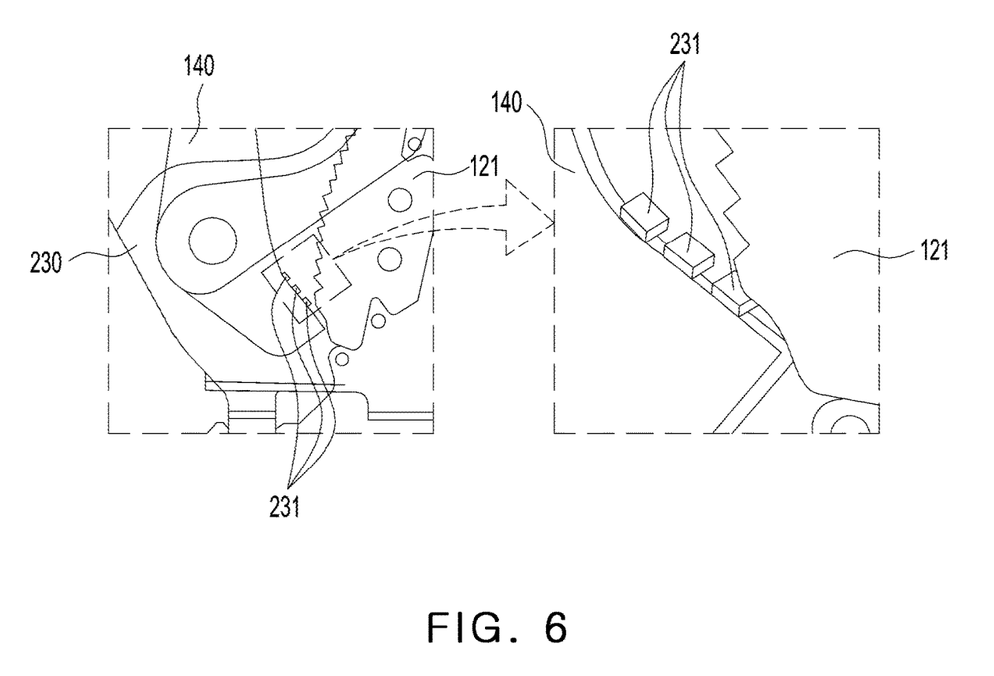
FIG. 6 is an explanatory view for illustrating a modified embodiment of a locking jaw.

FIG. 6 is an explanatory view for illustrating a modified embodiment of a locking jaw.

Meanwhile, the drawing on the right of FIG. 6 is illustrated in projected perspective view.

Referring to FIG. 6, a locking jaw 231 may be formed of a protrusion provided to protrude from an internal surface of an operation lever 230. As an exemplary embodiment of the present disclosure, a plurality of protrusions forming the locking jaw 231 may be spaced from each other. Furthermore, the locking jaw 231 may be provided to support one side surface of a pawl 140. Accordingly, when the vehicle brake apparatus 100 (refer to FIG. 3) does not operate, the pawl 140 and the gear unit 121 may be spaced from each other with a predetermined distance.

Figure 7:
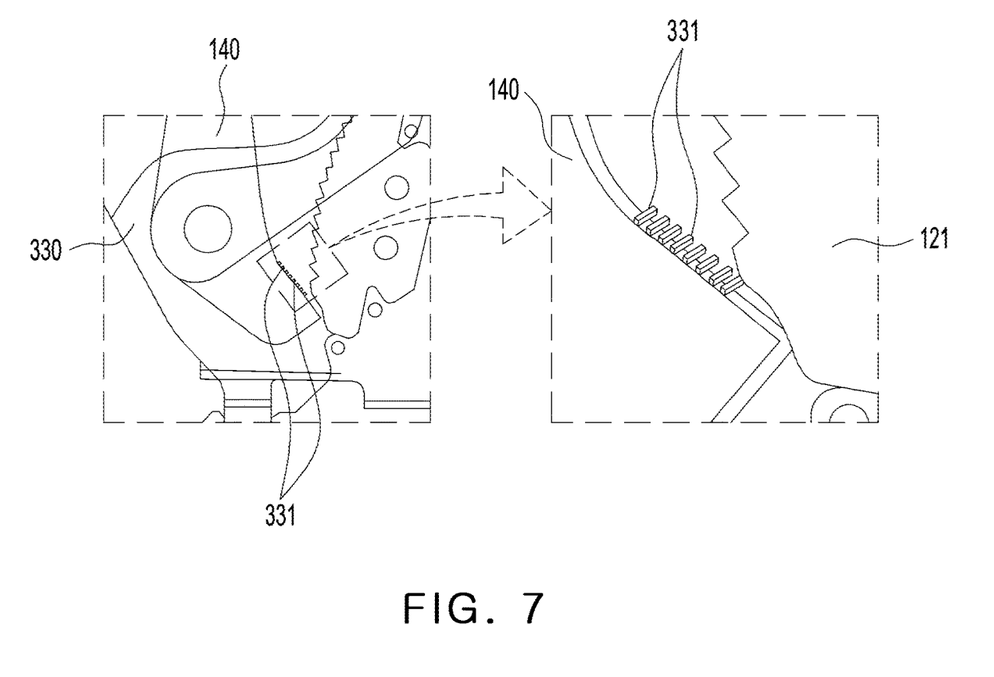
FIG. 7 is an explanatory view for illustrating a modified embodiment of a locking jaw.

FIG. 7 is an explanatory view for illustrating a modified embodiment of a locking jaw.

Meanwhile, the drawing shown on the right side of FIG. 7 is shown in a projected perspective view.

Referring to FIG. 7, a locking jaw 331 may be formed of a plurality of pins provided to protrude from an internal surface of an operation lever 330. As an exemplary embodiment of the present disclosure, a plurality of pins forming the locking jaw 331 may be spaced from each other. Furthermore, the locking jaw 331 may be provided to support one side surface of the pawl 140. Accordingly, when the vehicle brake apparatus 100 (refer to FIG. 3) does not operate, the pawl 140 and the gear unit 121 may be spaced from each other with a predetermined distance.

As set forth above, according to an exemplary embodiment of the present disclosure, there is an effect that can reduce or prevent the occurrence of friction noise between the pawl and the ratchet during initial rotation of the operation lever.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A parking brake apparatus of a vehicle, the parking brake apparatus comprising:
   a support plate fixed on a vehicle;
   a ratchet including a gear unit, wherein the gear unit includes a plurality of teeth and the ratchet is provided adjacent to the support plate;
   an operation lever connected to a rotation shaft passing through the ratchet, wherein the rotation shaft is rotatable in operation of the operation lever; and
   a pawl coupled to the operation lever, and including an edge portion elastically in contact with the teeth,
   wherein the operation lever is provided with a locking jaw for preventing contact between the pawl and the gear unit,
   wherein the locking jaw is provided between the gear unit and the pawl, and
   wherein the locking jaw is formed by cutting a portion of a side surface of the operation lever and then bending the cut portion.

2. The parking brake apparatus of claim 1, wherein the locking jaw is provided so that a side surface of the locking jaw is in contact with a side surface of the pawl.

3. The parking brake apparatus of claim 1, wherein the rotation shaft is provided to pass through the support plate and the ratchet and is connected to the operation lever.

4. The parking brake apparatus of claim 1, wherein the pawl is connected to a first hinge pin to be hingedly coupled to the operation lever, and a first torsion spring is provided on the first hinge pin so that the teeth are elastically in contact with the pawl.

5. The parking brake apparatus of claim 1,
   wherein the first torsion spring includes a first end portion connected to the pawl and a second end portion connected to the operation lever, and
   wherein the first torsion spring elastically biases the edge portion of the pawl to be in contact with the teeth.

6. The parking brake apparatus of claim 1, further including a fixing release unit provided in an internal space of the operation lever, and releasing fixing of the pawl and the ratchet by moving the pawl.

7. The parking brake apparatus of claim 6, wherein the fixing release unit includes:
   a push rod provided in the internal space of the operation lever, wherein an upper end portion of the pawl is connected to a lower end portion of the push rod;
   a second hinge pin provided on the operation lever passing through a lower portion of the push rod so that the push rod is rotatable about the second hinge pin; and
   a second torsion spring connected to the second hinge pin and elastically supporting the push rod in one direction.

8. The parking brake apparatus of claim 7,
   wherein the push rod includes an elongated slot formed through a center portion thereof, and
   wherein a stop pin for limiting horizontal movement of the push rod is slidably engaged in the elongated slot.

9. The parking brake apparatus of claim 1, wherein the ratchet further includes:
   a plate unit including a through hole so that the rotation shaft is provided to pass through the through hole;
   the gear unit including the plurality of teeth provided on one side surface of the plate unit; and
   a fixing unit formed to extend from a bottom surface of the plate unit and connected to the vehicle.

10. The parking brake apparatus of claim 9, wherein the gear unit is detachably provided on the plate unit.

11. A parking brake apparatus of a vehicle, the parking brake apparatus comprising:
    a support plate fixed on a vehicle;
    a ratchet including a gear unit, wherein the gear unit includes a plurality of teeth and the ratchet is provided adjacent to the support plate;
    an operation lever connected to a rotation shaft passing through the ratchet,
    wherein the rotation shaft is rotatable in operation of the operation lever; and a pawl coupled to the operation lever, and including an edge portion elastically in contact with the teeth, wherein the operation lever is provided with a locking jaw for preventing contact between the pawl and the gear unit, wherein the locking jaw is provided between the gear unit and the pawl, and wherein the locking jaw is formed of a plurality of pins protruding from an internal surface of the operation lever.

* * * * *